United States Patent
Amano

(10) Patent No.: US 10,294,912 B2
(45) Date of Patent: May 21, 2019

(54) ROTATION BLADE ATTACHMENT METHOD FOR REGENERATION ENERGY TYPE ELECTRIC GENERATION APPARATUS

(75) Inventor: Yoshiyuki Amano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1438 days.

(21) Appl. No.: 13/372,698

(22) Filed: Feb. 14, 2012

(65) Prior Publication Data

US 2013/0074335 A1   Mar. 28, 2013

Related U.S. Application Data

(63) Continuation of application No. PCT/JP2011/071675, filed on Sep. 22, 2011.

(51) Int. Cl.
*F03B 3/06* (2006.01)
*F03D 1/06* (2006.01)
(Continued)

(52) U.S. Cl.
CPC .............. *F03B 3/06* (2013.01); *F03B 13/264* (2013.01); *F03B 17/061* (2013.01); *F03D 1/0658* (2013.01); *F03D 13/10* (2016.05); F05B 2230/604 (2013.01); F05B 2230/61 (2013.01); F05B 2260/406 (2013.01); Y02E 10/223 (2013.01); Y02E 10/28 (2013.01);
(Continued)

(58) Field of Classification Search
CPC .......... F03D 1/001; F03D 1/003; F03D 1/005; F05B 2230/61; F05B 2240/916; F05B 2240/226; F05B 2240/30; B66C 1/108; B66C 13/08; B66C 23/185

USPC ................... 29/889.21, 889.1, 889
See application file for complete search history.

(56) References Cited

U.S. PATENT DOCUMENTS 7,207,777 B2   4/2007  Bervang
2006/0228220 A1  10/2006  Wobben
(Continued)

FOREIGN PATENT DOCUMENTS

EP   1507975 B1   3/2006
EP   2003333 A1  12/2008
(Continued)

OTHER PUBLICATIONS

International Search Report and Written Opinion for PCT/JP2011/071675 dated Jan. 10, 2012.
(Continued)

*Primary Examiner* — Moshe Wilensky
(74) *Attorney, Agent, or Firm* — Kanesaka Berner and Partners, LLP

(57) ABSTRACT

A blade attaching method is provided for a power generating apparatus which may include a blade, a hub having a blade attaching part, a bearing, a generator, and a pitch drive mechanism. The method may include, but is not limited to: a step of attaching a suspension device to the blade; a step of lifting the blade; a step of holding the blade so that the blade attaching part of the hub faces the blade root part of the; a step of rotating the blade attaching part by the pitch drive mechanism to a set angular position while holding the hub; and a step of fixing the blade to the hub after rotating the blade attaching part to the set angular position.

12 Claims, 6 Drawing Sheets

(51) Int. Cl.
 *F03B 17/06* (2006.01)
 *F03B 13/26* (2006.01)
 *F03D 13/10* (2016.01)

(52) U.S. Cl.
 CPC .......... *Y02E 10/721* (2013.01); *Y02P 70/523* (2015.11); *Y02P 70/525* (2015.11); *Y02P 70/527* (2015.11); *Y10T 29/49316* (2015.01)

(56) References Cited

U.S. PATENT DOCUMENTS

| | | |
|---|---|---|
| 2008/0216301 A1 | 9/2008 | Hansen et al. |
| 2009/0025219 A1 | 1/2009 | Hansen et al. |
| 2009/0058096 A1 | 3/2009 | Wobben |
| 2009/0324380 A1* | 12/2009 | Pedersen ............. F03D 1/001 414/800 |
| 2010/0018055 A1 | 1/2010 | Lynderup et al. |
| 2010/0135797 A1 | 6/2010 | Nies |
| 2010/0135808 A1 | 6/2010 | Wiebrock et al. |
| 2011/0173811 A1* | 7/2011 | Iversen ....................... 29/889.1 |
| 2011/0206510 A1* | 8/2011 | Langen et al. ................ 416/61 |

FOREIGN PATENT DOCUMENTS

| | | |
|---|---|---|
| EP | 1925583 B1 | 4/2010 |
| EP | 2182206 A2 | 5/2010 |
| EP | 1925582 B1 | 6/2010 |
| EP | 2084098 B1 | 2/2011 |
| JP | 2006513356 A | 4/2006 |
| JP | 2008128253 A | 6/2008 |
| JP | 2011080466 A | 4/2011 |

OTHER PUBLICATIONS

Decision to Grant a Patent dated Jun. 6 2014, corresponds to Japanese patent application No. 2012-507509.
English translation of International Search Report and Written Opinion for PCT/JP2011/071675 dated Jan. 10, 2012.
Extended European Search Report dated May 22, 2014, corresponds to European patent application No. 11817197.4.
International Preliminary Report on Patentability dated Apr. 3, 2014, corresponds to PCT/JP2011/071675.
Decision to Grant a European Patent dated Jun. 11, 2015, corresponding to European patent application No. 11817197.4.

* cited by examiner

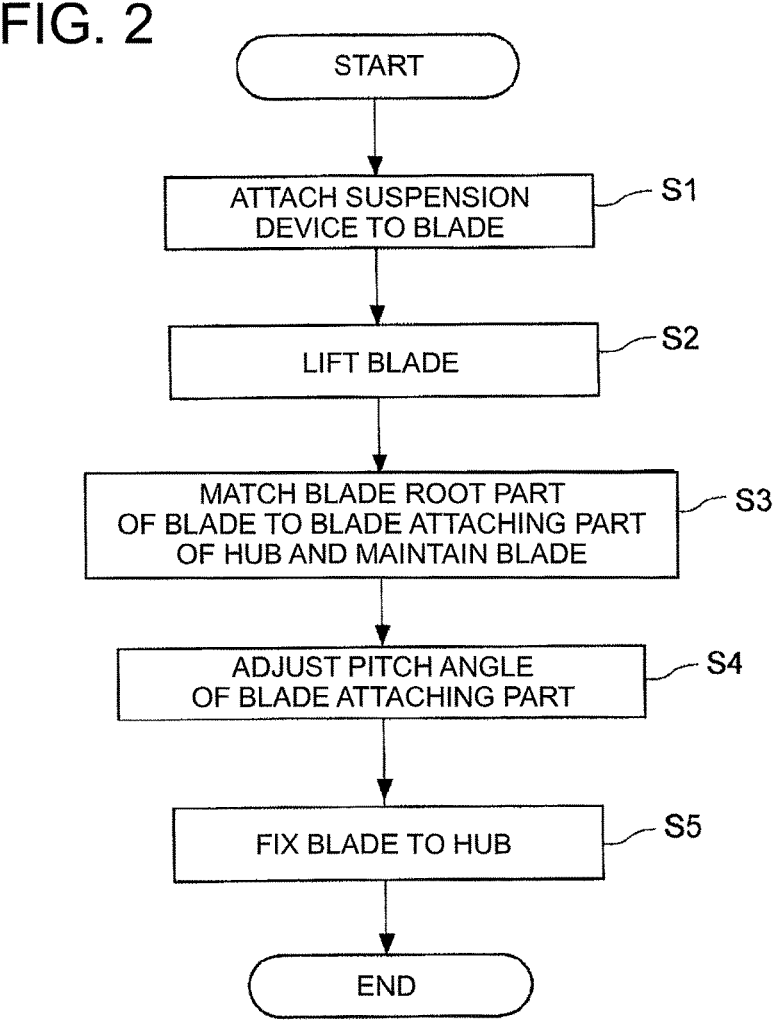
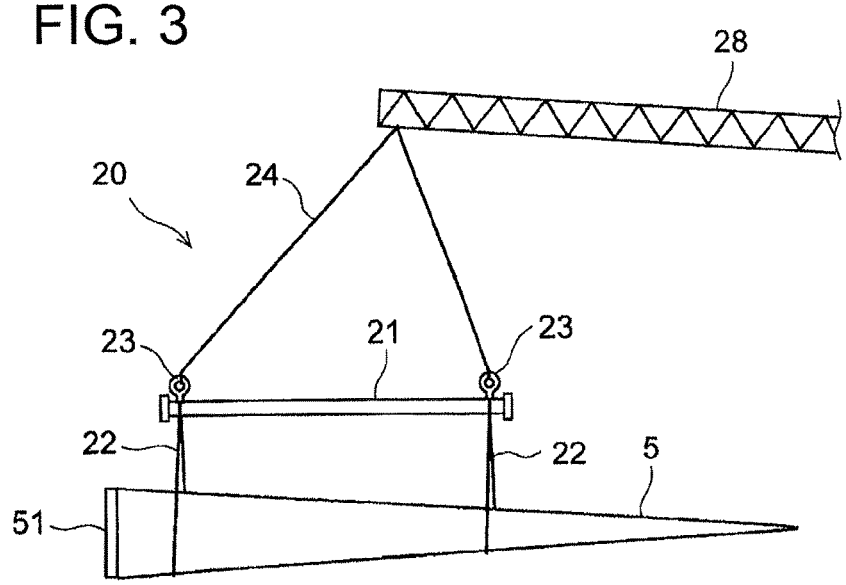

ROTATION BLADE ATTACHMENT METHOD FOR REGENERATION ENERGY TYPE ELECTRIC GENERATION APPARATUS

RELATED APPLICATIONS

The present application is a continuation of International Application Number PCT/JP2011/071675, filed Sep. 22, 2011, the disclosure of which is hereby incorporated by reference herein in its entirety.

TECHNICAL FIELD

The present invention relates to a blade attaching method a power generating apparatus of renewable energy type, which transmits rotation energy of a blade rotated by renewable energy to a generator to generate power. The power generating apparatus of renewable energy type generates power from renewable energy such as wind, tidal current, ocean current and river current and, the power generating apparatus of renewable energy type, for instance, includes a wind turbine generator, a tidal generator, an ocean current generator, a river current generator or the like.

BACKGROUND ART

In recent years, from a perspective of preserving the environment, it is becoming popular to use a power generating apparatus of renewable energy type such as a wind turbine generator utilizing wind power and renewable energy type turbine generator such as a tidal current generator utilizing tidal. In the power generating apparatus of renewable energy type, a motion energy of the wind, the tidal current, the ocean current or the river current rotates the blade and the rotation energy is inputted to the generator via the hub and the main shaft to generate power into electric power by the generator.

For instance, the wind turbine generator is provided with a tower, a nacelle installed atop the tower, a main shaft rotatably attached to the nacelle, a hub connected to the main shaft, blades attached radially to the hub. In this wind turbine generator, the rotation energy of the blade rotated by the wind power is inputted to the generator via the hub and the main shaft to generate electrical power. Further, the wind turbine generator is further provided with a pitch angle control mechanism for controlling the pitch angle of the blade to efficiently extract the wind power energy. The pitch angle control mechanism is also used to reduce the torque of the rotor by changing the pitch angle of the blade toward a feathering position to feather the wind when the load acting on the wind turbine generator increases rapidly.

In such wind turbine generator, when attaching the blade, first the blade is lifted to a height of the nacelle and then a blade root part of the blade and a blade attaching part of the hub are fastened together, thereby attaching the blade to the hub. In such a case that there is enough flat land around the location of the wind turbine generator, the blade may be attached to the hub before mounting the hub to the nacelle.

As related technique, disclosed in Patent Literature 1 is a blade attaching method in which the blade is maintained horizontally when the blade is lifted to the hub. According to the method, an orientation of the blade is maintained substantially the same by use of control wires connecting the blade to a winch. Further, disclosed in Patent Literature 2 is another blade attaching method in which the blade is clamped horizontally by a clamping device and lifted to the hub and then the blade is attached to the hub. Further, disclosed in Patent Literature 3 is yet another blade attaching method in which, when the blade is attached to the hub, the pitch angle of the blade is adjusted. According to this method, the blade is held by a holding device including a frame and a seat. The orientation of the blade is adjusted by rotating the holding device in a direction of the pitch angle.

CITATION LIST

Patent Literature

[PTL 1]
EP 1925582A
[PTL 2]
EP 1507975A
[PTL 3]
EP2084098A

SUMMARY OF INVENTION

Technical Problem

As described above, a power generating apparatus of renewable energy type has blades whose pitch angle is adjustable. Thus, when attaching the blade, a connection part of the blade side and the connection part of the hub side must be matched.

Therefore, in the conventional blade attaching method disclosed in Patent Literature 1 and 2, while maintaining its orientation, the blade is lifted and then attached to the hub so that the connection part on the blade side matches the connection part on the hub side. This requires a large-scale equipment such as the clamping device to hold and lift the blade and when the orientation of the blade is changed due to a strong wind or the like, the blade must be lowered to adjust the orientation and lifted again.

In the method disclosed in Patent Literature 3, the holding device with the blade held therein is rotated in the direction of the pitch angle to adjust the orientation of the blade. However, changing the orientation of the blade in midair is extremely difficult and it requires a high level of skill to properly adjust the orientation of the blade.

In view of the issues above, it is an object of the present invention is to provide a blade attaching method for a power generating apparatus of renewable energy type, which is capable of attaching the blade to the hub easily without using a large-scale equipment for attaching the blade.

Solution to Problem

The present invention provides a blade attaching method for a power generating apparatus of renewable energy type which includes a blade, a hub having a blade attaching part to which the blade is attached and a bearing which supports the blade attaching part rotatably, a generator to which a torque is inputted from a side of a rotor including the blade and the hub, and a pitch drive mechanism which adjusts a pitch angle of the blade by rotating the blade attaching part and the method may include, but is not limited to, the steps of;

holding the blade in such a manner that the blade attaching part of the hub faces a blade root part of the blade;

rotating the blade attaching part to a set angular position by the pitch drive mechanism in such a state that the blade is held; and after rotating the blade attaching part to the set angular position, fixing the blade to the hub.

According to the blade attaching method for the power generating apparatus of renewable energy type, the blade attaching part is rotated to the set angular position by the pitch drive mechanism in such a state that the blade is held and then the blade is fixed to the hub. Thus, it is no longer needed to adjust the orientation of the blade to match the blade attaching part on the hub side and the blade can be attached to the hub easily without a large-scale equipment for attaching the blade. Further, in the case of lifting the blade to the hub, even when the orientation of the blade changes due to a strong wind or the like, the blade can be attached to the hub without changing its orientation by rotating the blade attaching part on the hub side using the pitch drive mechanism. Further, in the process of facing the blade attaching part of the hub to the blade root part of the blade, the hub may be already attached to the nacelle or may be still placed on the ground and not attached to the nacelle yet.

In the above blade attaching method for the power generating apparatus of renewable energy type, the blade attaching part of the hub may be formed with a first fastening part, and the blade root part of the blade is formed with a second fastening part to be fitted to the first fastening part, in the rotating step, the blade attaching part may be rotated to a position where the first fastening part matches the second fastening part, and in the fixing step, the blade may be fixed to the hub by means of the first fastening part and the second fastening part.

In this manner, in the step of rotating the blade attaching part, the blade attaching part of the hub is rotated to the position where the first fastening part formed on the blade attaching part of the hub matches the second fastening part formed on the blade root part of the blade. Thus, in the step of fixing the blade to the hub, the first and second fastening parts are simply fastened together, thereby fixing the blade to the hub appropriately with absolutely no pitch angle adjustment performed on the blade side. The fitting of the fastening parts includes screwing the fastening parts together.

In the above blade attaching method for the power generating apparatus of renewable energy type, in the holding step, the blade may be held in such a state that the blade is suspended using a rope attached to the blade so that a longitudinal direction of the blade coincides with a horizontal or vertical direction.

In this manner, in the holding step, the blade is held in such a state that the blade is suspended using the rope so that the longitudinal direction of the blade coincides with the horizontal or vertical direction. Thus, it is easy to match the position of the blade attaching part of the hub in the rotation direction of the rotor to the position of the blade root part of the blade.

In such case, the rope is preferably a fiber rope.

Herein, ropes made from synthetic fiber such as nylon and polyester may be used as the fiber rope.

In this manner, using of the fiber rope as the rope lowers the cost of the device for lifting the blade and also facilitates transferring of the device.

In the above blade attaching method for the power generating apparatus of renewable energy type, the pitch drive mechanism may include, but is not limited to, an electric motor which rotates the blade attaching part and a power source which supplies power to the electric motor, and the blade attaching method may also include the step of starting to supply the power to the electric motor, before the rotating step.

In this manner, by driving the pitch drive mechanism using the electric motor, the maintainability of the wind turbine generator is improved.

Further, when attaching the blade, the power generating apparatus of renewable energy type is normally in a shutdown state and thus the power supply is stopped as well. Thus, before the step of rotating the blade attaching part, the power is supplied to the electric motor in the step of starting to supply the power, so as to rotate the blade attaching part smoothly. The electric motor may be installed permanently in the power generating apparatus of renewable energy type or may be installed temporary when attaching the blade.

In such case, the power generating apparatus of renewable energy type may include a plurality of the blades, a plurality of the electric motors may be provided for the plurality of the blades, respectively, a control panel including a plurality of control circuits which control the plurality of the electric motors, respectively, and the blade attaching method may further include the step of:

before the rotating step, selecting a corresponding one of the control circuits which corresponds to the electric motor for the blade attaching part which is to be rotated.

In this manner, by providing the plurality of circuits are provided to control the plurality of the electric motors, respectively, and selecting a corresponding one of the control circuits which corresponds to the electric motor for the blade attaching part to be rotated before the step of rotating the blade attaching part, the continuous blade attaching operation can be achieved.

In the above blade attaching method for the power generating apparatus, the pitch drive mechanism may include, but is not limited to:

a hydraulic motor which rotates the blade attaching part;

a hydraulic pump which pressurizes operating oil to be supplied to the hydraulic motor;

a hydraulic line through which the operating oil circulates between the hydraulic motor and the hydraulic pump; and a valve which is provided in the hydraulic line and which controls supply of the operating oil to the hydraulic motor, and before the rotating step, the method my further include the step of:

starting the supply of the operating oil to the hydraulic motor by opening the valve.

As described above, the pitch drive mechanism is driven by the hydraulic motor and it is possible to achieve large drive force and thus, the hydraulic motor can be reduced in size.

In such case, the above power generating apparatus of renewable energy type may include a plurality of the blades, the hydraulic motor and the valve may be provided for each of the blades, a control panel including a plurality of control circuits may be provided, each of the control circuits controlling an opening of the valve, and the blade attaching method may further include the step of:

before the rotating step, selecting a corresponding one of the control circuits which corresponds to the valve for the blade attaching part which is to be rotated.

As described above, the control panel including a plurality of control circuits is provided, each of the control circuits controlling the opening of the valve, and before the rotating step, a corresponding one of the control circuits which corresponds to the valve for the blade attaching part which is to be rotated, is selected. Thus, it is possible to perform the continuous blade attaching operation of the blade is possible.

Further, in the above case, in the above power generating apparatus of renewable energy type, an accumulator may be connected to the hydraulic line, the accumulator storing the operating oil having been pressurized by the hydraulic pump, the blade attaching method may further include the step of:

before the holding step, storing high pressure operating oil having been pressurized by the hydraulic pump in the accumulator, the hydraulic pump being driven by power supplied from a grid side during operation of the power generating apparatus of renewable energy type, and in the rotating step, the high pressure operating oil stored in the accumulator may be supplied to the hydraulic motor.

In this manner, by driving the hydraulic pump by the power supplied from the grid side during operation of the power generating apparatus of renewable energy type, storing the pressurized operating oil in the accumulator and once the power generating apparatus is stopped, supplying the pressurized operating oil from the accumulator to the hydraulic motor in the rotating step, it is possible, after the power generating apparatus is stopped, to drive the pitch drive mechanism while minimizing the power used for attaching the blade.

Furthermore, the above power generating apparatus of renewable energy type may be a wind turbine generator in which the rotor is rotated by the wind in a form of the renewable energy and the torque is inputted from the rotor side to the generator to generate power in the generator.

Advantageous Effects of Invention

According to the present invention, in such a state that the blade is held, the blade attaching part on the hub side is rotated to the set angular position using the pitch drive mechanism and then fixed to the hub. Thus, it is no longer needed to adjust the orientation of the blade to match the blade attaching part on the hub side and the blade can be attached to the hub easily without a large-scale equipment for attaching the blade. Further, in the case of lifting the blade to the hub, even when the orientation of the blade changes due to a strong wind or the like, the blade can be attached to the hub without changing its orientation, by rotating the blade attaching part on the hub side using the pitch drive mechanism.

BRIEF DESCRIPTION OF DRAWINGS

FIG. 2 is a flow chart showing a blade attaching method for the wind turbine generator in relation to an embodiment of the present invention.

FIG. 3 is a schematic view showing a blade in a lifted state.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

Figure 1:
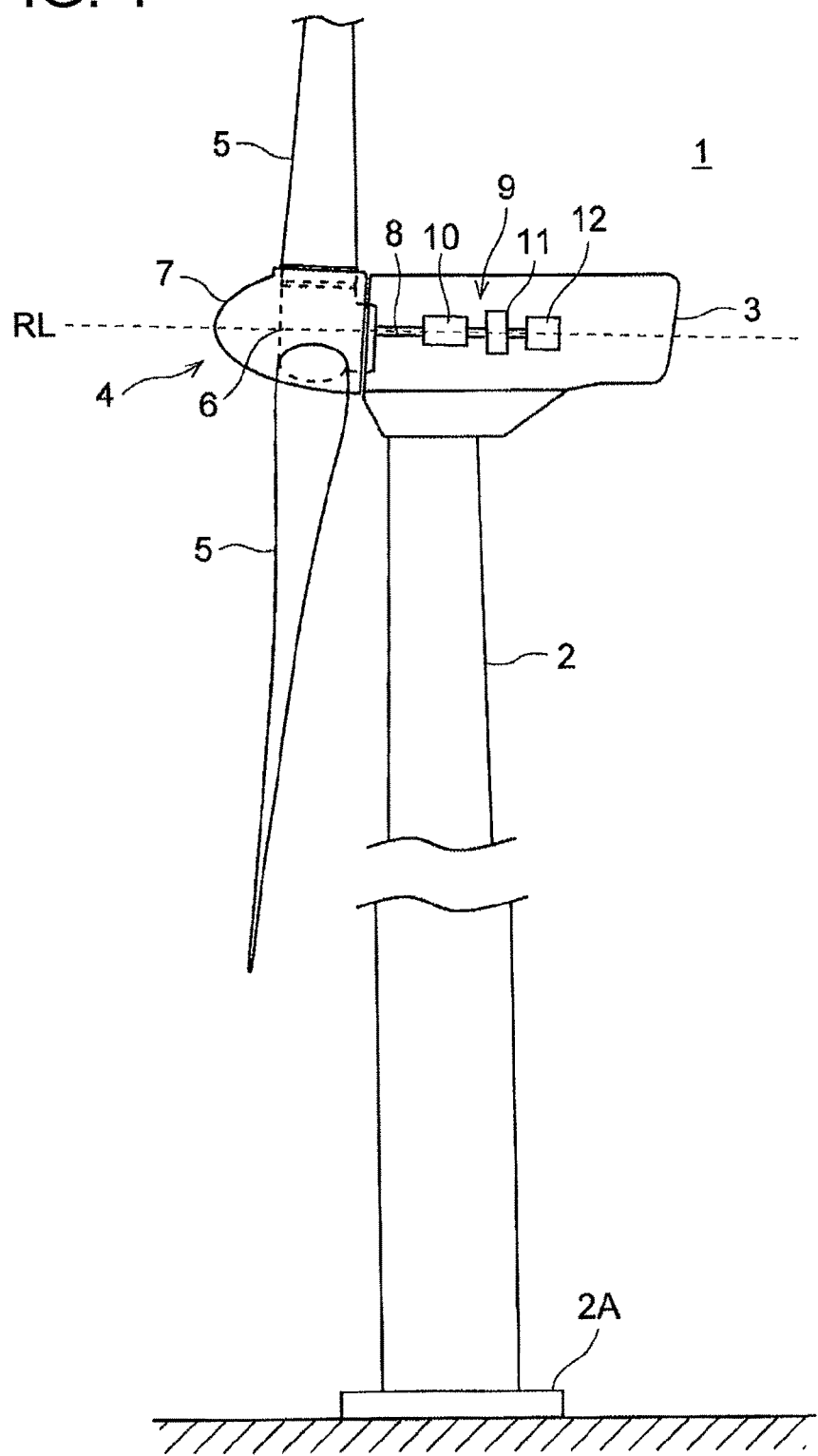
FIG. 1 shows an overall structure of a wind turbine generator in relation to an embodiment of the present invention.

In an embodiment of the present invention, a wind turbine generator is used as an example of the power generating apparatus of renewable energy type. FIG. 1 shows an overall structure of the wind turbine generator in relation to the embodiment of the present invention.

As shown in FIG. 1, the wind turbine generator mainly includes a tower 2, a nacelle 3 mounted atop the tower 2, a rotor 4 rotated upon receiving the wind, a transmission increasing the rotation speed of the rotor 4 and a generator 12 generating electric power.

The tower 2 is installed upright on a base 2A on the ground or offshore. The tower 2 extends vertically from a base part on the base side to a top part. At the top part of the tower 2, the nacelle is supported rotatably.

The rotor 4 is formed by the blade 5, the hub 6 to which the blade is attached and a main shaft 6 connected to the hub 6.

The blade 5 is attached to the hub 6 rotatably in the direction of the pitch angle. FIG. 1 shows the example with three blades. However, this is not limitative and it may be two blades or more than three blades.

The hub 6 is attached to the nacelle 3. A plurality of the blades 5 are attached to the hub 6 radially around a rotation axis line, RL. A head capsule 7 is provided around the hub 6 to cover the hub 6.

The head capsule 7 covers the hub 6 and rotates with the blade 5 and the hub 6 around the rotation axis line RL as a center axis.

The main shaft 8 is arranged inside the nacelle 3 which is supported rotatably by the tower 2. Further, the main shaft 8 is supported on the nacelle side rotatably via a main shaft bearing.

With the above structure, the wind acting on the blade 5 rotates the entire rotor 4. The rotation of the main shaft 8 is increased in the transmission 9 and the increased rotation speed is inputted to the generator 12 to generate electric power in the generator 12.

The transmission 9 may be a mechanical transmission (gear type) or a hydraulic transmission. As an example, the mechanical transmission is illustrated in FIG. 1. More specifically, the mechanical transmission 9 includes a step-up gear 10 for increasing the rotation speed of the main shaft 8. Further, the transmission 9 may include a transmission mechanism 11 for transmitting a damping torque, such as a clutch, a torque converter and a continuously variable transmission (CVT). In contrast, the hydraulic transmission (not shown) includes a hydraulic pump driven by the rotation of the main shaft 8, a hydraulic motor coupled to the generator 12 and a high pressure oil line and a low pressure oil line that are provided between the hydraulic pump and the hydraulic motor.

In reference to the flow chart of FIG. 2, a blade attaching method for the wind turbine generator in relation to the embodiment of the present invention is explained. In the method described here, the blades 5 are attached one by one to the hub 6 mounted to the nacelle 3.

Figure 4:
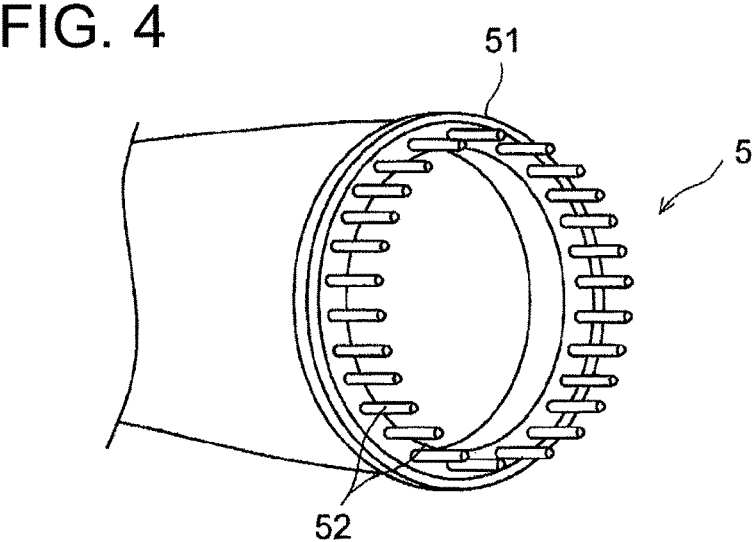
FIG. 4 is an oblique perspective view of a blade root part of the blade.

In this method, as shown in FIG. 4, bolts 52 may be fitted to the blade root part 51 of the blade 5 beforehand as a preparation step. The bolts 52 are screwed into bolt holes 62 of a blade attaching part 61 of the hub 6 and used to fix the blade 5 to the hub 6.

First, in a step S1, a suspension device 20 is attached to the blade 5. FIG. 3 is a schematic view showing the blade 5 in a suspended state. As shown in FIG. 3, the suspension device 20 is preferably provided with ropes 22, 24 attached to the blade 5. As the rope 22, 24, a fiber rope is preferably used as it is cheap to lower the cost of the suspension device 20 and is easy to transfer. Particularly, from a perspective of strength, a synthetic fiber rope made of nylon, polyester or the like is preferable.

More specifically, fiber ropes 22 are attached to two points of the blade 5 with a distance from each other in the longitudinal direction of the blade 5. These ropes 22 are then attached to a suspension jig 21 of a rod shape. The suspension jib 21 has a pair of shackles 23 at its both ends and another pair of fiber ropes 24 are attached to the shackles 23. Then, the blade 5 is lifted by a crane 28 using the fiber ropes 24 so that the longitudinal direction of the blade 5 substantially coincides with the horizontal direction. In this process, the fiber ropes 24 may be suspended from the crane 28 at one suspension point as shown in FIG. 3, or at two suspension points. This, however, does not limit the invention. In the example shown in FIG. 3, the blade 5 is lifted in such a state that the longitudinal direction of the blade 5 is maintained horizontally. However, this is not limitative and the blade 5 may be lifted in such a state that the longitudinal direction of the blade 5 is maintained vertically.

In a step S2, the blade 5 is lifted to a height of the hub 6 while being suspended.

Next, in a step S3, the blade attaching part 61 of the hub 6 (see FIG. 5) and the blade root part 51 of the blade 5 (see FIG. 4) are brought to face each other and the blade 5 is maintained there. In this process, the blade attaching part 61 of the hub 6 and the blade root part 51 of the blade 5 may be brought to a facing position by rotating the hub 6 around the rotation axis line, RL (see FIG. 1) by means of the rotor drive mechanism (not shown).

Next, in a step S4, the pitch drive mechanism adjusts the pitch angle of the blade 5 by rotating the blade attaching part 61 of the hub 6.

Figure 5:
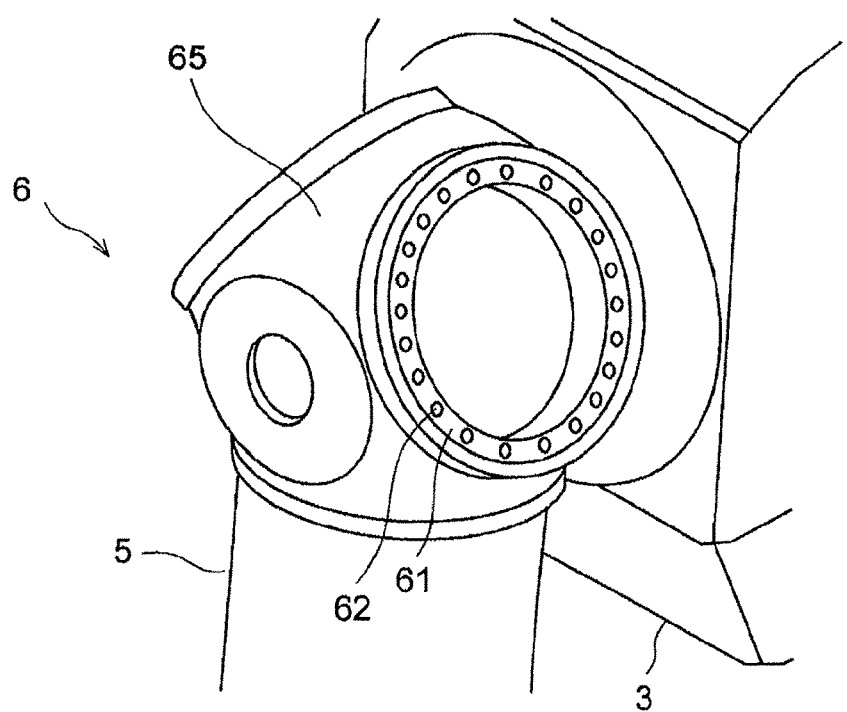
FIG. 5 is an oblique perspective view of a hub.

As shown in FIG. 4, the blade root part 51 of the blade 5 is provided with a plurality of bolts 52 (a second fastening part) circumferentially around a blade axis line. In a manner similar to this, as shown in FIG. 5, the blade attaching part 61 of the hub 6 is formed with a plurality of bolt holes 62 (a first fastening member) circumferentially around a center of a blade attaching plane. The first fastening member and the second fastening member are formed to fit into each other. Therefore, in the step S4, the blade attaching part 61 is rotated by the pitch drive mechanism to a position where the bolt holes 62 of the blade attaching member 61 match the bolts 52 of the blade 5. In the examples shown in FIG. 4 and FIG. 5, the first fastening member is the bolt holes 62 and the second fastening member is the bolts 52. However, this is not limitative and the first fastening member may be bolts while the second fastening member is bolt holes or any combination of the fastening members.

Figure 6:
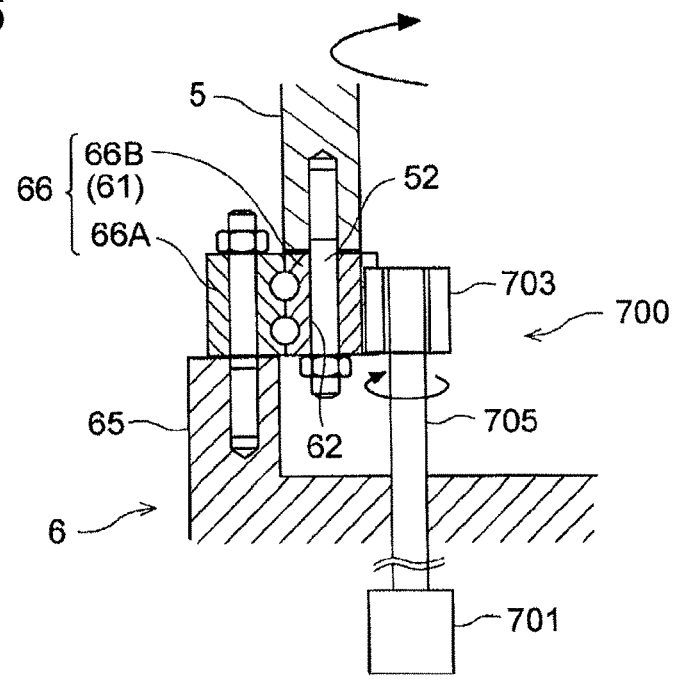
FIG. 6 is a schematic view showing an example of a sliding structure of a pitch drive mechanism and a blade attaching part.

In reference to FIG. 6, one example of a sliding structure of the blade attaching part of the pitch drive mechanism and the blade attaching part is explained. In FIG. 6, a power system of the pitch drive mechanism is partially shown and a control system of the pitch drive mechanism is not shown. These systems are later described in details in reference to FIG. 8 and FIG. 9.

As shown in FIG. 6, the blade attaching part 61 is attached rotatably to a hub body 65. The hub 6 is provided with the hub body 65 coupled to the blades 5, the blade attaching part 61 to which the blades 5 are attached and a bearing 66 which supports the blade attaching part 61 rotatably to the hub body 65.

The bearing 66 is provided between the hub body 65 and the blade attaching part 61 and is formed by an outer ring 66A and an inner ring 66B. The outer ring is fixed to the hub body 65 and the inner ring 66B is fixed to the blade attaching part 61. In the embodiment, the inner ring 66B constitutes the blade attaching part 61. Between the outer ring 66A and the outer ring 66B, a ball bearing is installed to reduce sliding resistance. Further, the inner ring 66B is formed with internal teeth on an inner periphery.

The pitch drive mechanism fundamentally adjusts the pitch angle of the blade 5 attached to the blade attaching part 61 by rotating the blade attaching part 61 of the hub 6. However, in the embodiment, the pitch drive mechanism rotates the blade attaching part 61 without the blade 5 attached thereto so as to adjust the pitch angle. FIG. 6 shows a power system 700 of the pitch drive mechanism 700. The pitch drive mechanism 700 mainly includes a pinion gear 703, a shaft 705 and a motor 701. The motor 701 is fixed to the hub side. The pinion gear 703 is formed on the outer periphery with external teeth to mesh with internal teeth of the inner ring 66B. In the power system 700 of the pitch drive mechanism, when the shaft 705 is rotated by the motor 701, the pinion gear 703 coupled to the shaft 705 rotates in synchronization. This causes the external teeth of the pinion gear 703 to mesh with the internal teeth of the inner ring 66B, thereby rotating the inner ring 66B. In this manner, the pitch angle of the blade attaching part 61 is adjusted. A plurality of the power systems 700 may be provided along the inner periphery of the inner ring 66B.

In the above description, the pitch drive mechanism rotates the blade attaching part 61 by means of the gear meshing with the blade attaching part 61. The pitch drive mechanism may have any structure as long as it is capable of rotating the blade attaching part 61 directly or indirectly.

Figure 7:
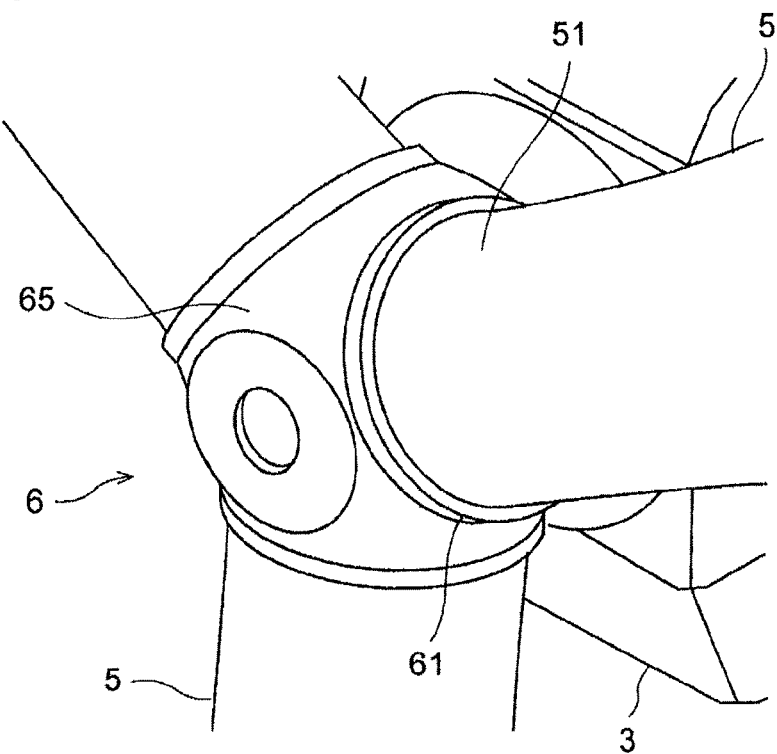
FIG. 7 is an oblique perspective view of the blade fixed to the hub.

Then, in a step S5, the bolts 52 of the blade root part 51 of the blade 5 are screwed into the bolt holes 62 of the blade attaching part of the hub 6 to fix the blade 5 to the hub 6. In this process, preferably, the bolts 52 are inserted through the bolt holes 62 and nuts are screwed to tips of the bolts 52 to fasten the bolts 52 and the bolt holes 62 together. In this manner, the blade 5 is fixed to the hub 6 as shown in FIG. 7.

In such a case that a plurality of blades 5 are provided, after a first blade is attached to the hub 6, the rotor 4 is rotated and then a second blade is attached. As for the second blade, the second blade can be attached to the hub 6 by conducting the steps S1 to S5 described above. By repeating the steps S1 to S5 as many times as the number of the blades 5, all the blades 5 can be attached to the hub 6.

In this manner, the blade 5 is held in the step S3, the blade attaching part 61 on the hub side is rotated to the set angular position by the pitch drive mechanism in the step S4, and then the blade 5 is fixed to the hub 6 in the step S5. Thus, it is no longer necessary to adjust the orientation of the blade 5 to match the blade attaching part 61 on the hub side or to provide a large-scale device for attaching the blade, and it is now possible to attach the blade 5 to the hub 6 easily. In such a case that the blade 5 is lifted and attached to the hub 8, even when the orientation of the blade 5 is changed due to a strong wind or the like, the blade 5 can be attached to the hub 6 without changing the orientation of the hub 5 by rotating the blade attaching part 61 on the hub side using the pitch drive mechanism.

Further, in the step S4 of rotating the blade attaching part 61, the blade attaching part 61 of the hub 6 is rotated to a position where the bolt holes 62 (the first fastening member) formed on the blade attaching part 61 of the hub 6 match the bolts 52 (the second fastening member) formed in the blade root part 51 of the blade 5. Thus, in the step S5 of fixing the blade 5 to the hub 6, the bolt holes 62 of the blade attaching part 61 and the bolts 52 of the blade 5 are simply fastened together, thereby fixing the blade 5 to the hub 6 appropriately with absolutely no pitch angle adjustment performed on the blade side.

Furthermore, in the step S3 of holding the blade 5, the blade 5 is held in such a state that the blade 5 is suspended using the rope attached to the blade 5 so that the longitudinal direction of the blade 5 coincides with the horizontal or vertical direction. Thus, the position of the blade attaching part 61 in the rotation direction of the rotor 4 can be easily matched to the position of the blade root part 51 of the blade 5.

In reference to FIG. 8 and FIG. 9, the power system and the control system of the pitch drive mechanism is explained below.

Figure 8:
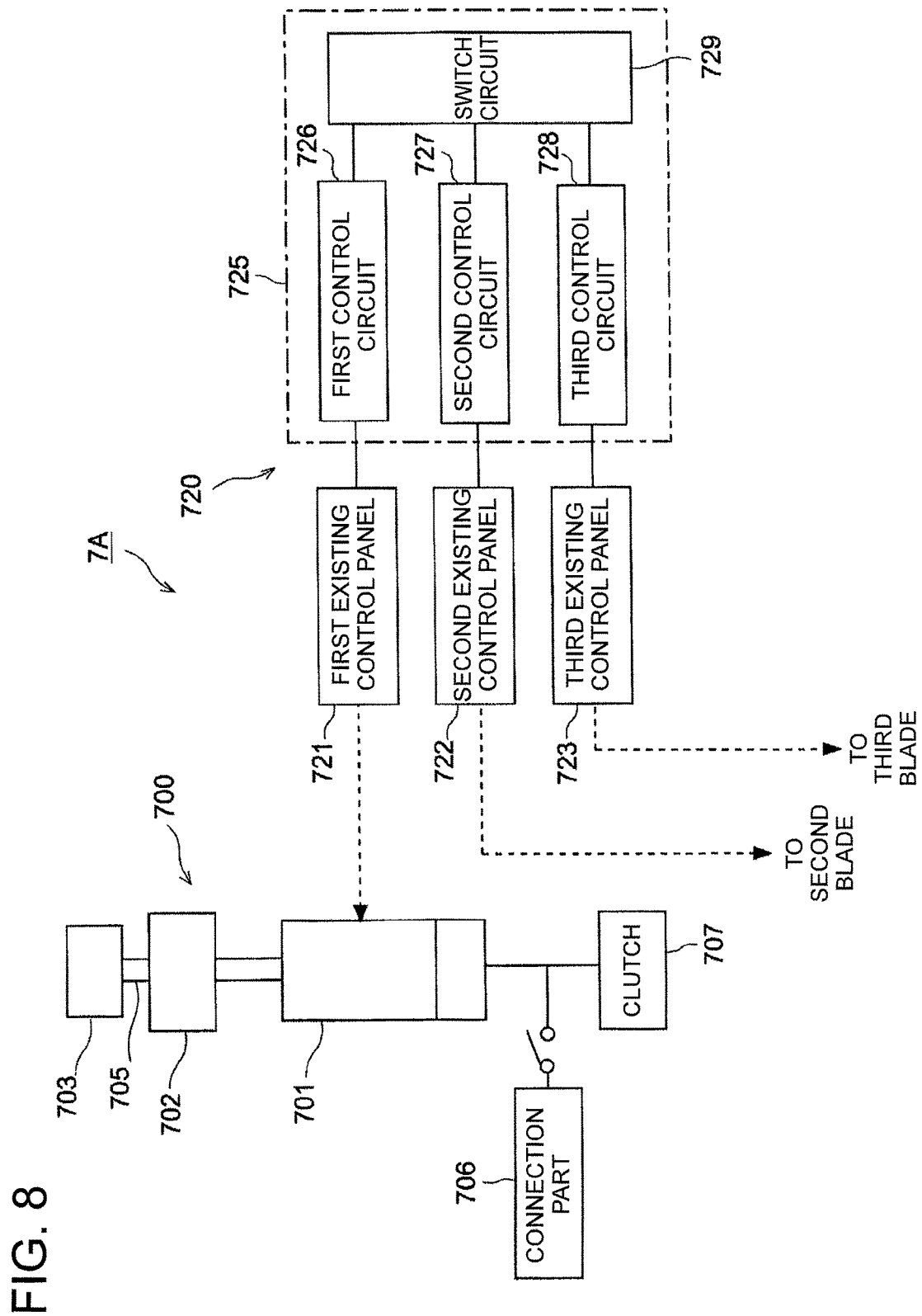
FIG. 8 shows a structure of a power system and a control system of the pitch drive mechanism in the case of using an electric motor.

FIG. 8 shows a structure of the power system and the control system of the pitch drive mechanism in the case of using the electric motor.

As shown in FIG. 8, a pitch drive mechanism 7A includes the power system 700 using the electric motor 701 and the control system 720 which controls the power system 700.

The power system 700 is provided in the hub 6 or the nacelle 3, and includes the electric motor 701, a reducer 702 and a pinion gear 703. To the electric motor 701, the power is supplied from a grid power source 706 during the operation of the wind turbine generator 1 and, when the wind turbine generator 1 is stopped and the blade 5 is being attached, the power is supplied from a temporary power source 707. The temporary power source 707 may be installed temporary installed at the time of attaching the blade 5, or may be installed permanently.

When the blade 5 is attached to the hub 6, the electric motor 701 is powered by the power supplied from the temporary power source 707. The rotation of the electric motor 701 is reduced by the reducer 702 and then transmitted to the pinion gear via the shaft 705. Then, the external teeth formed on the outer periphery of the pinion gear 703 mesh with the internal teeth of the inner ring 66B shown in FIG. 6, thereby rotating the blade attaching part 61 of the hub 6.

The control system 720 includes a first existing control panel 720, a second existing control panel 722, a third existing control panel 723 and a temporary control panel 725.

The first, second and third existing control panels 721, 722, 723 are arranged in the nacelle 3 or the hub 6.

The first existing control panel 721 mainly controls the pitch angle of the first blade during the normal operation of the wind turbine generator 1. More specifically, the first existing control panel 721 controls the pitch angle of the first blade to extract the wind power energy efficiently and also controls the pitch angle of the first blade toward the feathering position to reduce the torque of the rotor by feathering the wind when the load on the wind turbine generator 1 increases rapidly.

The second existing control panel 722 mainly controls the pitch angle of the second blade during the normal operation of the wind turbine generator 1.

The third existing control panel 723 mainly controls the pitch angle of the third blade during the normal operation of the wind turbine generator 1.

The second and third existing control panels 722, 723 have substantially the same configuration as the first existing control panels 721 and thus are not explained further in details.

The temporary control panel 725 is arranged in the nacelle 3 or the hub 6. The temporary control panel 725 may be installed temporary installed during attaching of the blade 5 while the wind turbine generator 1 is stopped, or may be installed permanently. This temporary control panel 725 includes a first control circuit 726, a second control circuit 727, a third control circuit 728 and a switching circuit 729.

As one example, the wind turbine generator 1 used in the embodiment includes three blades 5 and hence, there are the first to third existing control panels and the first to third control panels. However, the number of the existing control panels and control circuits is determined depending on the number of the blades.

The first control circuit 726 mainly controls the pitch angle of the blade attaching part corresponding to the first blade when attaching of the blade 5 while the wind turbine generator 1 is stopped. More specifically, when attaching the first blade to the hub 6, the first control circuit controls the electric motor 702 to rotate the blade attaching part 61 by a set angle.

The second control circuit 727 mainly controls the pitch angle of the blade attaching part corresponding to the second blade when attaching of the blade 5 while the wind turbine generator 1 is stopped The third control circuit 728 mainly controls the pitch angle of the blade attaching part corresponding to the third blade when attaching of the blade 5 while the wind turbine generator 1 is stopped.

The second and third existing control circuits 727, 728 have substantially the same configuration as the first existing control panels 726 and thus are not explained further in details.

The switching circuit 729 switches to a corresponding one of the control circuits which corresponds to the electric motor for the blade to be attached.

In the wind turbine generator 1 having the power system 700 and the control system 720 described above, the method of attaching the blade 5 also includes the following steps before the step S4 of rotating the blade attaching part as described in FIG. 2. Those steps are the step of starting to supply the power to the electric motor 701 from the temporary power source 707 and the step of selecting, by use of the switching circuit 729, a corresponding control circuit of the first to third control circuits which corresponds to the blade 5 which is to be attached. Then, the blade attaching part 61 is rotated by controlling the electric motor 701 using the selected control circuit.

In this manner, the power is supplied to the electric motor for rotating the blade attaching part in the step of starting to supply the power before the step S4 of rotating the blade attaching part 61. Thus, the blade attaching part is rotated smoothly. Further, the control circuits are sequentially switched by selecting a corresponding control circuit which corresponds to the electric motor 701 for the blade attaching part 61 to be rotated. Thus, it is possible to conduct the blade attaching process in a continuous manner.

Figure 9:
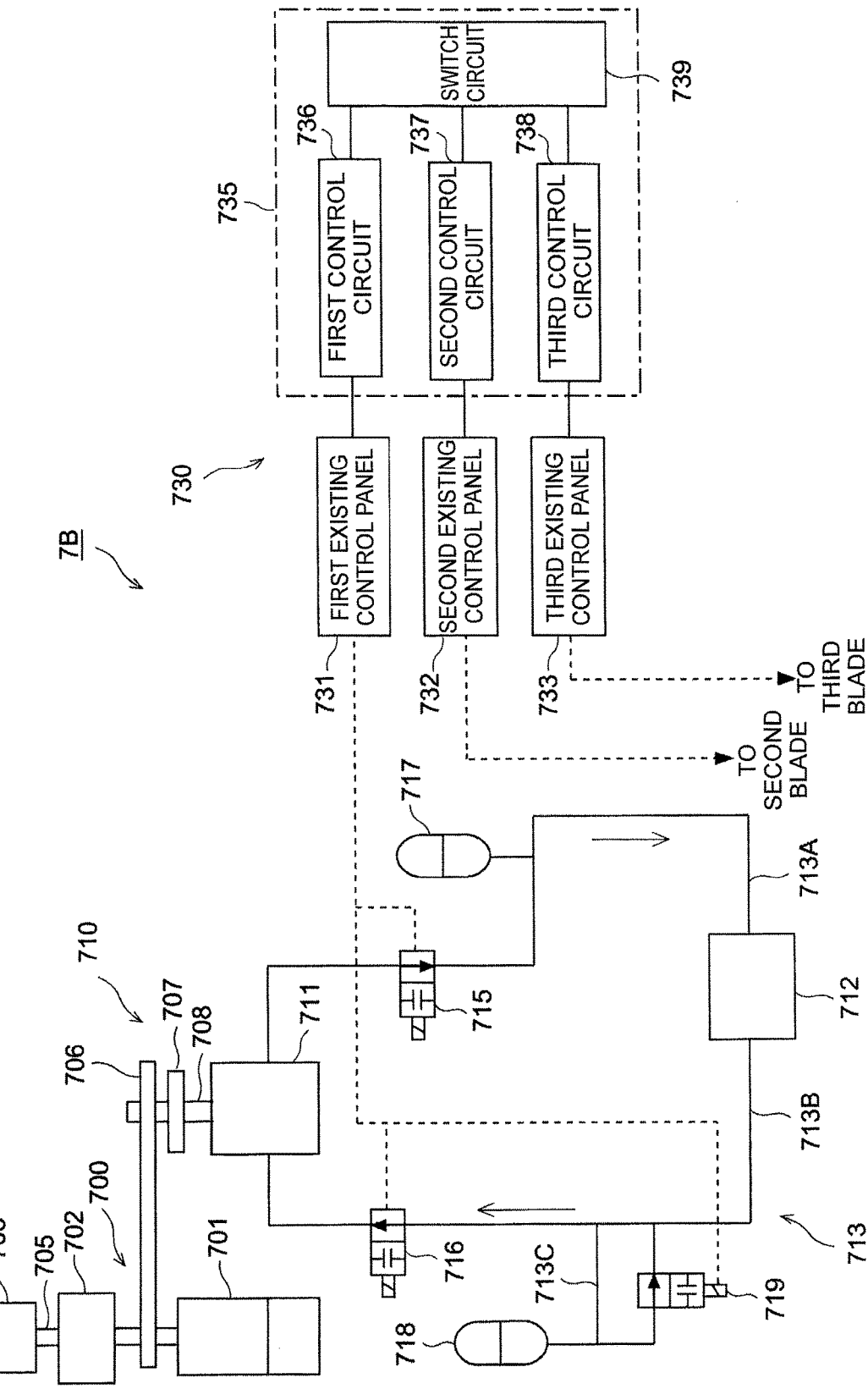
FIG. 9 shows a structure of the power system and the control system of the pitch drive mechanism in the case of using a hydraulic motor.

FIG. 9 shows a structure of the power system and the control system of the pitch drive mechanism in the case of using a hydraulic motor.

As shown in FIG. 9, a pitch drive mechanism 7B includes the power system 700 used during the normal operation of the wind turbine generator 1, another power system 710 used during attaching of the blade 5, and the control system 730 which controls the power systems 700, 710.

The power system 700 is used during the normal operation of the wind turbine generator 1 and adjusts the pitch angle of the blade 5 using the electric motor 701. The power system 700 includes the electric motor 701, the reducer 702 and the pinion gear 703. The power is supplied from the grid power source to the electric motor 701 to actuate the electric motor 701. The rotation of the electric motor 701 is reduced by the reducer 702 and then transmitted to the pinion gear 703 via the shaft 705. Then, the external teeth formed on the outer periphery of the pinion gear 703 mesh with the internal teeth of the inner ring 66B shown in FIG. 6, thereby rotating the blade attaching part 61 of the hub 6. In response to the rotation of the blade attaching part 61, the blade attached to the blade attaching part 61 rotates.

The power system 710 is used during attaching of the blade 5, and adjusts the pitch angle of the blade attaching part 61 of the hub 6 by the use of the hydraulic motor 711. The power system 710 mainly includes the hydraulic motor 711, a hydraulic pump 712, a hydraulic line 713 and electromagnetic valves 715, 716.

The hydraulic motor 711 rotates the shaft 708 by supplying the operating oil having been pressurized in the hydraulic pump 712. The rotation of the shaft 708 is inputted to the reducer 702 via a connection part 706 to reduce the rotation speed and then transmitted to the pinion gear 703 via the shaft 705. Then, the external teeth formed on the outer periphery of the pinion gear 703 mesh with the internal teeth of the inner ring 66B shown in FIG. 6, thereby rotating the blade attaching part 61 of the hub 6. Further, a clutch During the normal operation of the wind turbine generator 1, a clutch 707 is provided between the hydraulic motor 711 and the connection part 706. During the normal operation of the wind turbine generator 1, the clutch 707 is released to disconnect the hydraulic motor 711 from the reducer 702.

The hydraulic line 713 includes a low pressure oil line 713A and a high pressure oil line 713B. The low pressure oil line 713A is provided between an outlet side of the hydraulic motor 711 and an inlet side of the hydraulic pump 712 to allow the low pressure operating oil (hereinafter, low pressure oil) having been discharged from the hydraulic motor 711 to flow therein. The high pressure oil line 713B is provided between an outlet side of the hydraulic pump 712 and an inlet side of the hydraulic motor 711 to allow the high pressure operating oil (hereinafter, high pressure oil) having been pressurized in the hydraulic pump 712 to flow therein. Further, the electromagnetic valve 715 is provided in the low pressure oil line 713A and the electromagnetic valve 716 is provided in the high pressure oil line 713B to adjust the flow of the operating oil in each line.

The hydraulic line 713 may include a branch line 713C which is connected to the high pressure oil line 713B. In the branch line 713C, preferably a high pressure accumulator 718 is provided to store the high pressure oil. In the branch line 713C, an electromagnetic valve 719 is provided to adjust the flow of the operating oil.

Furthermore, in the low pressure oil line 713A, a low pressure accumulator 717 may be provided to store the low pressure oil.

The control system 730 includes a first existing control panel 731, a second existing control panel 732, a third existing control panel 733 and a temporary control panel 735.

The first, second and third existing control panels 731, 732, 733 are arranged in the nacelle 3 or the hub 6.

The first existing control panel 731 mainly controls the pitch angle of the first blade during the normal operation of the wind turbine generator 1. More specifically, the first existing control panel 731 controls the pitch angle of the first blade to extract the wind power energy efficiently and also controls the pitch angle of the first blade toward the feathering position to reduce the torque of the rotor by feathering the wind when the load on the wind turbine generator 1 increases rapidly.

The second existing control panel 732 mainly controls the pitch angle of the second blade during the normal operation of the wind turbine generator 1.

The third existing control panel 733 mainly controls the pitch angle of the third blade during the normal operation of the wind turbine generator 1.

The second and third existing control panels 732, 733 have substantially the same configuration as the first existing control panels 731 and thus are not explained further in details.

The temporary control panel 735 is arranged in the nacelle 3 or the hub 6. The temporary control panel 735 may be installed temporary installed during attaching of the blade 5 while the wind turbine generator 1 is stopped, or may be installed permanently. This temporary control panel 725 includes a first control circuit 736, a second control circuit 737, a third control circuit 738 and a switching circuit 739.

As one example, the wind turbine generator 1 used in the embodiment includes three blades 5 and hence, there are the first to third existing control panels and the first to third control panels. However, the number of the existing control panels and control circuits is determined depending on the number of the blades.

The first control circuit 736 mainly controls the pitch angle of the blade attaching part corresponding to the first blade when attaching of the blade 5 while the wind turbine generator 1 is stopped. More specifically, when attaching the first blade to the hub 6, the electromagnetic valves 715, 716 are opened to actuate the hydraulic motor 711 and then the blade attaching part 61 is rotated by the set angle.

The second control circuit 737 mainly controls the pitch angle of the blade attaching part corresponding to the second blade when attaching of the blade 5 while the wind turbine generator 1 is stopped The third control circuit 738 mainly controls the pitch angle of the blade attaching part corresponding to the third blade when attaching of the blade 5 while the wind turbine generator 1 is stopped.

The second and third existing control circuits 737, 738 have substantially the same configuration as the first existing control panels 736 and thus are not explained further in details.

The switching circuit 739 switches to a corresponding one of the control circuits which corresponds to the electromagnetic valves 715, 716 of the hydraulic circuit for the blade to be attached.

In the wind turbine generator 1 having the power system 710 and the control system 730 described above, the method of attaching the blade 5 also includes the following step before the step S4 of rotating the blade attaching part as described in FIG. 2. The step is the step of selecting a corresponding one using the switching circuit 739 from the first to third control circuits, which corresponds to the blade which is to be attached. Using the selected control circuit, the electromagnetic valves 715, 716 are controlled to open so as to activate the hydraulic pump 711, thereby rotating the blade attaching part 61.

In this manner, before the step S4 of attaching the blade attaching part 61, a corresponding control circuit which corresponds to the electromagnetic valves 715, 716 of the blade attaching part 716 which is to be rotated, is selected and switched to in a sequential manner. Thus, t is possible to perform the blade attaching operation continuously.

Before the step S3 of holding the blade 5, the blade attaching method may also include the step of storing high pressure operating oil having been pressurized by the hydraulic pump 712 in the high pressure accumulator 718, the hydraulic pump 712 being driven by power supplied from the grid side during operation of the wind turbine generator 1. In the step S4 of rotating the blade attaching part 61, the high pressure oil stored in the high pressure accumulator 718 is supplied to the hydraulic motor 711. By this, the pitch drive mechanism 7B can be still activated while minimizing the power used for attaching the blade 5 while the wind turbine generator 1 is stopped.

As described above, according to the blade attaching method for the power generating apparatus of the above embodiments, in such a state that the blade 5 is held, the blade attaching part 61 on the hub side is rotated to the set angular position using the pitch drive mechanism 7A, 7B and then fixed to the hub 6. Thus, it is no longer needed to adjust the orientation of the blade 5 to match the blade attaching part 61 on the hub side and the blade 5 can be attached to the hub 6 easily without a large-scale equipment for attaching the blade. Further, in the case of lifting the blade 5 to the hub 6, even when the orientation of the blade 5 changes due to a strong wind or the like, the blade 5 can be attached to the hub 6 without changing the orientation, by rotating the blade attaching part 61 on the hub side using the pitch drive mechanism 7A, 7B.

While the present invention has been described with reference to exemplary embodiments, it is obvious to those skilled in the art that various changes may be made without departing from the scope of the invention.

For instance, in the above embodiments, described is the case in which the blades 5 are attached one by one to the hub 6 attached to the nacelle 3. However, this is not limitative and more than one blade 5 may be attached to the hub 6 at the same time or the blade 5 may be attached to the hub 6 which is placed on the ground before being attached to the nacelle 3.

Further, in the above embodiments, the wind turbine generator 1 is described as one particular example of the power generating apparatus of renewable energy type. However, the present invention is also applicable to other types of power generating apparatuses of renewable energy type.

For instance, the present invention is applicable to a power generating apparatus which generates power from tidal current, ocean current or river current and whose tower extends vertically downward in the ocean or water from the base part to the tip part of the tower and whose main shaft rotates upon receiving tidal current, ocean current or river current on the blade.

The invention claimed is:

1. A blade attaching method for a power generating apparatus of renewable energy type which comprises a blade, a hub having a blade attaching part to which the blade is attached and a bearing which supports the blade attaching part rotatably, a generator to which a torque is inputted from a side of a rotor including the blade and the hub, and a pitch drive mechanism which adjusts a pitch angle of the blade by rotating the blade attaching part, the method comprising the steps of:
    holding the blade in such a manner that the blade attaching part of the hub faces a blade root part of the blade;
    rotating the blade attaching part to a set angular position by the pitch drive mechanism in such a state that the blade is held; and
    after rotating the blade attaching part to the set angular position, fixing the blade to the hub, the power generating apparatus further comprising:
    a plurality of the blades;
    a plurality of the pitch drive mechanisms provided to correspond to the plurality of the blades;
    a plurality of existing control panels provided for respectively controlling the plurality of the pitch drive mechanisms to adjust the pitch angle of each blade during normal operation of the power generating apparatus,
    the method further comprising:
    connecting a temporary control panel with the plurality of existing control panels, the temporary control panel including a plurality of control circuits which are provided respectively for the plurality of existing control panels and configured to control each pitch angle of the plurality of blades; and
    then selecting a corresponding one of the plurality of the control circuits, which corresponds to one of the existing control panels provided for the pitch drive mechanism of the blade attaching part to be rotated using a switching circuit of the temporary control panel, before the step of rotating the blade attaching part,
    wherein
    the pitch angle of the blade attaching part to be rotated is adjusted using the control circuit selected by the temporary control panel in the step of rotating the blade attaching part.

2. The blade attaching method for the power generating apparatus of renewable energy type according to claim 1, wherein the blade attaching part of the hub is formed with a first fastening part, and the blade root part of the blade is formed with a second fastening part to be fitted to the first fastening part,
    wherein, in the rotating step, the blade attaching part is rotated to a position where the first fastening part matches the second fastening part, and
    wherein, in the fixing step, the blade is fixed to the hub by means of the first fastening part and the second fastening part.

3. The blade attaching method for the power generating apparatus of renewable energy type according to claim 1, wherein, in the holding step, the blade is held in such a state that the blade is suspended using a rope attached to the blade so that a longitudinal direction of the blade coincides with a horizontal or vertical direction.

4. The blade attaching method for the power generating apparatus of renewable energy type according to claim 3, wherein the rope is a fiber rope.

5. The blade attaching method for the power generating apparatus of renewable energy type according to claim 1,
wherein the pitch drive mechanism comprises an electric motor which rotates the blade attaching part and a power source which supplies power to the electric motor, and
wherein, the method further comprises the step of:
before the rotating step, starting to supply the power to the electric motor.

6. The blade attaching method for the power generating apparatus according to claim 1,
wherein:
the plurality of the pitch drive mechanisms are a plurality of electric motors that rotate the blade attaching parts, respectively,
each of the plurality of the existing control panels is configured to control the plurality of
the electric motors so as to adjust the pitch angle of the plurality of the blades during the normal operation of the power generating apparatus of renewable energy type,
in the step of selecting a corresponding control circuit, the corresponding one of the control circuits which corresponds to the existing control panel provided for the electric motor of the blade attaching part to be rotated is selected by the switching circuit of the temporary control panel which comprises the plurality of the control circuits each corresponding to the plurality of the existing control panels, and is connected to the plurality of the existing control panels, and
in the step of rotating the blade attaching part, the electric motor of the blade attaching part to be rotated is controlled using the control circuit selected by used of the switching circuit.

7. The blade attaching method for the power generating apparatus according to claim 1,
wherein the pitch drive mechanism comprises:
a hydraulic motor which rotates the blade attaching part;
a hydraulic pump which pressurizes operating oil to be supplied to the hydraulic motor;
a hydraulic line through which the operating oil circulates between the hydraulic motor and the hydraulic pump; and
a valve which is provided in the hydraulic line and which controls supply of the operating oil to the hydraulic motor, and
wherein, before the rotating step, the method further comprises the step of:
starting the supply of the operating oil to the hydraulic motor by opening the valve.

8. The blade attaching method for the power generating apparatus according to claim 1,
wherein:
each of the plurality of the pitch drive mechanisms comprises a hydraulic motor which rotates the blade attaching part, a hydraulic pump which pressurizes operating oil to be supplied to the hydraulic motor, a hydraulic line through which the operating oil circulates between the hydraulic motor and the hydraulic pump; and a valve which is provided in the hydraulic line and which controls supply of the operating oil to the hydraulic motor,
each of the plurality of the existing control panels is configured to be able to adjust the supply of the operating oil to the hydraulic motor by controlling the valve of each of the pitch drive mechanisms so as to adjust the pitch angle of the plurality of the blades during the normal operation of the power generating apparatus, and
in the step of selecting a corresponding control circuit, the corresponding one of the control circuits which corresponds to the existing control panel provided for the electric motor of the blade attaching part to be rotated is selected by the switching circuit of the temporary control panel which comprises the plurality of the control circuits each corresponding to the plurality of the existing control panels, and is connected to the plurality of the existing control panels, wherein, in the step of rotating the blade attaching part, the valve of the hydraulic motor of the blade attaching part to be rotated is controlled using the control circuit selected by use of the switching circuit.

9. The blade attaching method for the power generating apparatus according to claim 7,
wherein, an accumulator is connected to the hydraulic line, the accumulator storing the operating oil having been pressurized by the hydraulic pump,
wherein the method further comprises the step of:
before the holding step, storing high pressure operating oil having been pressurized by the hydraulic pump in the accumulator, the hydraulic pump being driven by power supplied from a grid side during operation of the power generating apparatus of renewable energy type, and
wherein, in the rotating step, the high pressure operating oil stored in the accumulator is supplied to the hydraulic motor.

10. The blade attaching method for the power generating apparatus according to claim 1,
wherein the power generating apparatus of renewable energy type is a wind turbine generator in which the rotor is rotated by a wind in a form of the renewable energy and the torque is inputted from a rotor side to the generator to generate power in the generator.

11. The blade attaching method for the power generating apparatus of renewable energy type according to claim 1, wherein said plurality of existing control panels are arranged in the hub.

12. The blade attaching method for the power generating apparatus of renewable energy type according to claim 1, wherein said temporary control panel is arranged in the hub.

* * * * *